US012726054B2

(12) United States Patent
Mao et al.

(10) Patent No.: US 12,726,054 B2
(45) Date of Patent: Sep. 1, 2026

(54) ELECTRIC MOTOR

(71) Applicant: AAC Microtech (Changzhou) Co., Ltd., Jiangsu (CN)

(72) Inventors: Lubin Mao, Changzhou (CN); Wei Song, Changzhou (CN); Xiujiang Si, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 195 days.

(21) Appl. No.: 18/611,673

(22) Filed: Mar. 20, 2024

(65) Prior Publication Data

US 2025/0260271 A1 Aug. 14, 2025

Related U.S. Application Data

(63) Continuation of application No. PCT/CN2024/076864, filed on Feb. 8, 2024.

(51) Int. Cl.
*H02K 1/14* (2006.01)
*H02K 37/14* (2006.01)

(52) U.S. Cl.
CPC ............. *H02K 1/145* (2013.01); *H02K 37/14* (2013.01)

(58) Field of Classification Search
CPC ............................... H02K 1/145; H02K 37/14
See application file for complete search history.

(56) References Cited

U.S. PATENT DOCUMENTS

2004/0140730 A1* 7/2004 Barrho ..................... H02K 5/15 310/43
2008/0007126 A1* 1/2008 Popov .................... H02K 1/145 310/257
2008/0241513 A1* 10/2008 Komuro ................ H01F 1/0577 427/127
2021/0281156 A1* 9/2021 Wei ........................ H02K 37/04
2022/0301751 A1* 9/2022 Yokota .................... H01F 1/059

* cited by examiner

*Primary Examiner* — Oluseye Iwarere
*Assistant Examiner* — Masoud Vaziri
(74) *Attorney, Agent, or Firm* — Wiersch Law Group

(57) ABSTRACT

The present application provides an electric motor, belonging to the technical field of electric motors, including a plurality of magnetic steels arranged in a circumferential direction around a rotating shaft. two adjacent magnetic steels have opposite magnetic polarities at one end proximate to the rotating shaft, and two adjacent magnetic steels have opposite magnetic polarities at the other end; the magnetic steels are sintered magnetic steels. In this way, the plurality of sintered magnetic steels are separately molded and then spliced, so the magnetic circuit performance can be enhanced while simplifying the assembly process to meet the assembly requirements of different-sized motors. This approach will improve stability and reliability, thereby enhancing the driving performance of the motor. As a result, it achieves the technical effect of improving the driving performance of the motor.

9 Claims, 7 Drawing Sheets

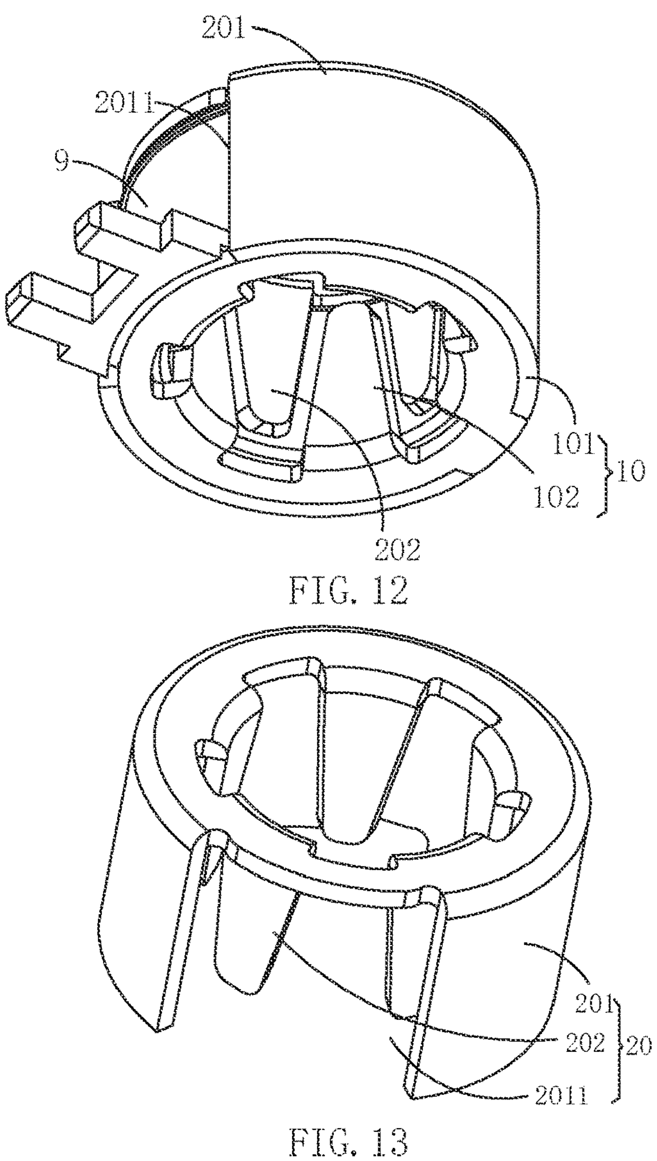
FIG. 12
FIG. 13
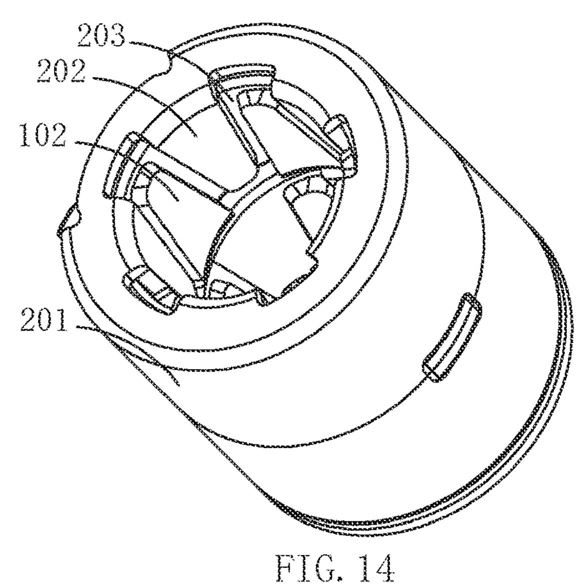
FIG. 14

ELECTRIC MOTOR

CROSS-REFERENCE TO RELATED APPLICATIONS

This application is a continuation of International Application No. PCT/CN2024/076864, filed on Feb. 8, 2024, the entire contents of which are incorporated herein by reference.

TECHNICAL FIELD

The present application relates to the technical field of electric motors, in particular to an electric motor.

BACKGROUND

The electric motor is an electromagnetic device that converts or transfers electrical energy, mainly composed of a stator and a rotor. As a special type of electric motor, a stepper motor belongs to an electric motor used for control. It is an electric motor that converts electrical pulse signals into corresponding angular displacement or linear displacement.

In the prior art, the electric motors typically employ bonded magnet structures for their magnetic steels, with coils wound around a frame and then assembled with the claw poles. However, the magnetic circuit performance of bonded magnet structures is generally lower, and the stability and reliability of bonded magnetic steels are poor, which hinders the improvement of the driving performance of the electric motor.

Therefore, it is necessary to provide a new technical solution to solve the above technical problems.

SUMMARY

An object of the present application is to provide an electric motor that can solve the problem of the prior art that is unfavorable to improving the driving performance of the electric motor.

The technical solution of the present application is as follows. An electric motor, comprising: a plurality of magnetic steels arranged in a circumferential direction around a rotating shaft; wherein two adjacent magnetic steels have opposite magnetic polarities at one end proximate to the rotating shaft, and two adjacent magnetic steels have opposite magnetic polarities at the other end; the magnetic steels are sintered magnetic steels.

In some embodiments, the electric motor further comprises a first claw pole; a second claw pole; and a first plastic member arranged outside the rotating shaft, comprising a plurality of spaced-apart first limit grooves and a second limit groove arranged between two adjacent first limit grooves; wherein the first claw pole comprises a first claw disc and a plurality of first claw fingers connected to the first claw disc, wherein the first claw fingers are embedded in the first limit grooves correspondingly; the second claw pole comprises a second claw disc and a plurality of second claw fingers connected to the second claw disc, wherein the second claw fingers are embedded in the second limit grooves correspondingly, and each of the second claw fingers is provided between two adjacent first claw fingers.

In some embodiments, the first plastic member comprises a first limit portion and a second limit portion arranged opposite to each other, and a housing connecting the first limit portion and the second limit portion; a plurality of support members are arranged between the first limit portion and the second limit portion, the first limit groove is enclosed by two adjacent support members and the first limit portion, and the second limit groove is enclosed by two adjacent support members and the second limit portion.

In some embodiments, the first limit portion, the support members, and the housing enclose to form a first through-slot for the first claw fingers to pass through; the first through-slot is in communication with the first limit groove; the second limit portion, the support members and the housing enclose to form a second through-slot for the second claw fingers to pass through, and the second through-slot is in communication with the second limit groove.

In some embodiments, the housing comprises a body and two extension portions connected to the body; the body is connected to the first limit portion and the second limit portion, and the body and the two extension portions enclose a mounting groove for placing a coil.

In some embodiments, the first claw fingers are tapered in a direction toward the second claw disc, the second claw fingers are tapered in a direction toward the first claw disc, and the first claw pole and the second claw pole are each integrally injection molded.

In some embodiments, the electric motor further comprises a third claw pole, a fourth claw pole, and a second plastic member arranged outside the rotating shaft, wherein the third claw pole comprises a third claw disc and a plurality of third claw fingers connected to the third claw disc, and the plurality of third claw fingers extend into the second plastic member; the fourth claw pole comprises a cover body and a plurality of fourth claw fingers connected to the cover body; the cover body is arranged outside the second plastic member; the plurality of fourth claw fingers extend into the second plastic member, and the fourth claw fingers are arranged between two adjacent third claw fingers.

In some embodiments, the electric motor further comprises an adhesive layer provided between two adjacent magnetic steels.

In some embodiments, the electric motor further comprises a coating provided at the other end of the magnetic steels.

In some embodiments, a magnetic energy product of the magnetic steels is greater than 26 MGOe and an intrinsic coercive force of the magnetic steels is greater than 11 KOe.

The beneficial effect of the present application is as follows. The present application provides an electric motor, in which a plurality of magnetic steels are arranged in a circumferential direction around a rotating shaft; two adjacent magnetic steels have opposite magnetic polarities at one end proximate to the rotating shaft, and two adjacent magnetic steels have opposite magnetic polarities at the other end; and the magnetic steels are sintered magnetic steels. In this way, the plurality of sintered magnetic steels are separately molded and then spliced, so the magnetic circuit performance can be enhanced while simplifying the assembly process to meet the assembly requirements of different-sized motors. This approach will improve stability and reliability, thereby enhancing the driving performance of the motor. As a result, it achieves the technical effect of improving the driving performance of the motor.

BRIEF DESCRIPTION OF THE DRAWINGS

FIG. 12 shows a structural schematic view of a third claw pole in the electric motor provided by an embodiment of the present application.

FIG. 13 shows a structural schematic view of a fourth claw pole in the electric motor provided by an embodiment of the present application.

FIG. 14 is a structural schematic view of a cover body in the electric motor provided by an embodiment of the present application.

DETAILED DESCRIPTION OF THE EMBODIMENTS

Figure 1:
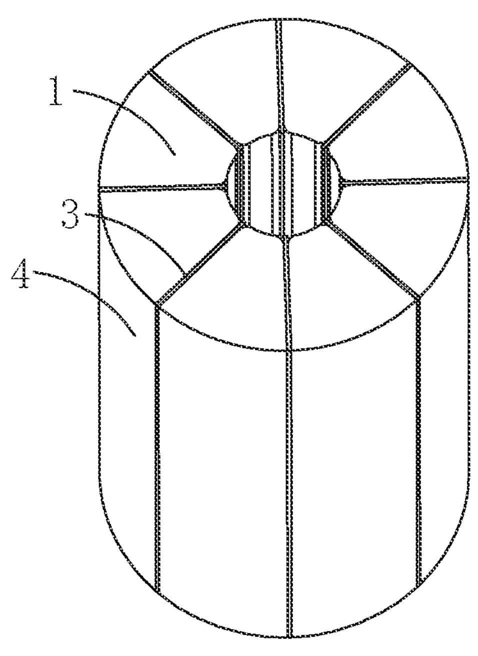
FIG. 1 shows a structural schematic view of magnetic steels in an electric motor provided by an embodiment of the present application.

Embodiments of the present application are described in detail below, and examples of the embodiments are shown in the accompanying drawings, in which the same or similar symbols throughout denote the same or similar elements or elements having the same or similar functions. The embodiments described below by reference to the accompanying drawings are exemplary and are intended to be used only for the purpose of explaining the present application and are not to be construed as a limitation of the present application.

In order to enable those in the art to better understand the embodiments of the present application, the technical solutions in the embodiments of the present application will be clearly and completely described below in conjunction with the accompanying drawings in the embodiments of the present application. Obviously, the described embodiments are only a part of the embodiments of the present application, and not all of the embodiments. Based on the embodiments in this application, all other embodiments obtained by a person skilled in the art without making creative labor fall within the protection scope of this application.

In the embodiments of the present application, at least one means one or more; more than one, means two or more than two. In the description of the present application, the terms "first", "second", "third", etc., are used only for the purpose of distinguishing the description, and are not to be understood as indicating or implying relative importance, nor are they to be understood to indicate or imply order.

References to "an embodiment" or "a number of embodiments" and the like in this specification mean that one or more embodiments of the present application include a particular feature, structure, or characteristic described in conjunction with that embodiment. Thus, in this specification, the terms "include", "comprise", "have", and variations thereof, mean "include but not limited to" unless otherwise specifically emphasized. It should be noted that, in the embodiments of the present application, "and/or" describes an associative relationship of the associated objects, indicating that three kinds of relationships may exist, for example, A and/or B, which may indicate the three cases of: the existence of A alone, the existence of both A and B, and the existence of B alone.

It should be noted that in embodiments of the present application, when a component is "fixed to" another component, it may be directly on the other component or there may be a centered component. When a component is "attached" to another component, it may be directly attached to the other component or there may be both centered components. When a component is considered to be "set on" another component, it may be set directly on the other component or there may be both centered components. Moreover, in this embodiment, "connect" may be understood as an electrical connection, and the connection of two electrical components may be a direct or indirect connection between two electrical components. For example, the connection between A and B may be either a direct connection between A and B or an indirect connection between A and B via one or more other electrical components. The terms "vertical", "horizontal", "left", "right" and the like are used in the embodiments of the present application for illustrative purposes only and are not intended to limit the invention.

An embodiment of the present application provides an electric motor, as shown in FIGS. 1 to 14, the electric motor provided in the embodiment of the present application includes a plurality of magnetic steels 1. The plurality of magnetic steels 1 are arranged in a circumferential direction around a rotating shaft 2. Two adjacent magnetic steels 1 have opposite magnetic polarities at one end proximate to the rotating shaft 2, and two adjacent magnetic steels 1 have opposite magnetic polarities at the other end. The magnetic steels 1 are sintered magnetic steels 1.

The plurality of magnetic steels 1 are fixedly connected to the rotating shaft 2, and the plurality of magnetic steels 1 may refer to two magnetic steels 1, three magnetic steels 1, four magnetic steels 1, five magnetic steels 1, six magnetic steels 1, etc. For example, when the number of magnetic steels 1 is six, the six magnetic steels 1 are symmetrically distributed with the rotating shaft 2 at the center, and the whole of the six magnetic steels 1 is presented in the form of a cylinder after being spliced together, with the rotating shaft 2 arranged through the center of the cylinder. Each magnetic steel 1 has opposite magnetic polarities at one end away from the rotating shaft 2 and at one end proximate to the rotating shaft 2. For example, the magnetic polarity at one end of the magnetic steel 1 proximate to the rotating shaft 2 is an N pole, and the magnetic polarity at the other end of the magnetic steel 1 away from the rotating shaft 2 is an S pole. Moreover, in two adjacent magnetic steels 1, the two magnetic steels 1 have opposite magnetic polarities at one end of the two magnetic steels 1 proximate to the rotating shaft 2. For example, if the magnetic polarity of an end of one magnetic steel 1 proximate to the rotating shaft 2 is N-pole, then the magnetic pole of one end of the other magnetic steel 1 proximate to the rotating shaft 2 is S-pole. The two adjacent magnetic steels 1 have opposite magnetic polarities at the other end. For example, if the magnetic polarity of an end of one magnetic steel 1 away from the rotating shaft 2 is S-pole, the magnetic pole of the end away from the rotating shaft 2 in the other magnetic steel 1 adjacent to that magnetic steel 1 is N-pole.

The magnetic steels 1 are sintered magnetic steels 1, thereby effectively improving the torque of the product. The plurality of magnetic steels 1 can be individually machined and molded separately in advance and then spliced, which can make the assembly process simpler, and also satisfy the assembly requirements of electric motors of different sizes.

In this embodiment, a plurality of magnetic steels 1 are arranged in a circumferential direction around the rotating shaft 2. Two adjacent magnetic steels 1 have opposite magnetic polarities at one end proximate to the rotating shaft 2, two adjacent magnetic steels 1 have opposite magnetic polarities at the other end, and the magnetic steels 1 are sintered magnetic steels 1. In this way, the plurality of sintered magnetic steels are separately molded and then spliced, so the magnetic circuit performance can be enhanced while simplifying the assembly process to meet the assembly requirements of different-sized motors. This approach will improve stability and reliability, thereby enhancing the driving performance of the motor. As a result, it achieves the technical effect of improving the driving performance of the motor.

Figure 2:
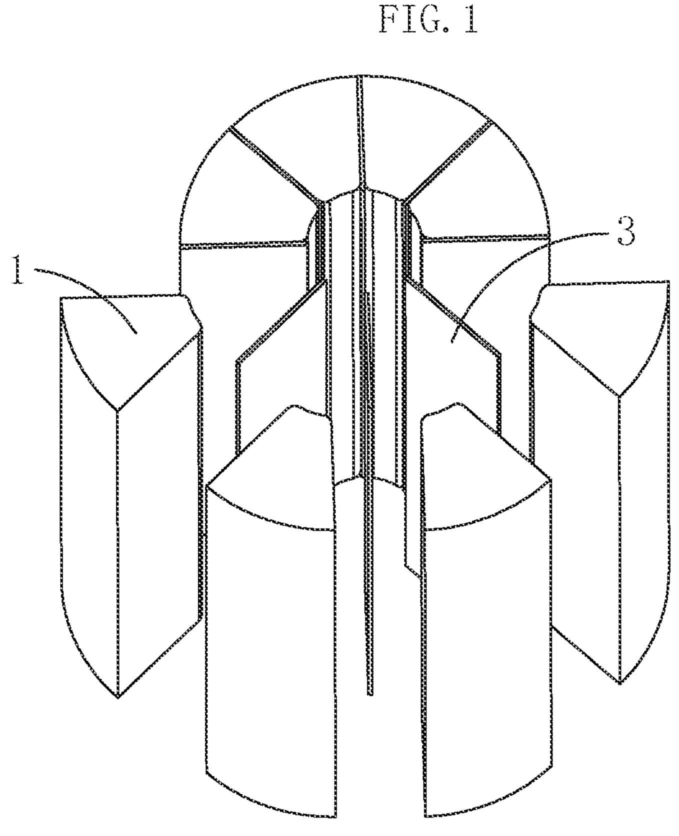
FIG. 2 shows a structural schematic view of an adhesive layer in the electric motor provided by an embodiment of the present application.

As an embodiment, as shown in FIGS. 1 and 2, an electric motor provided by an embodiment of the present application further includes an adhesive layer 3, and the adhesive layer 3 is arranged between two adjacent magnetic steels 1. The two adjacent magnetic steels 1 are bonded and fixed to each other through the adhesive layer 3. The adhesive layer 3 may be used with glue, and the use of the adhesive layer 3 for fixing the two adjacent magnetic steels 1 is able to improve the stability of the plurality of magnetic steels 1 after splicing.

As an embodiment, an electric motor provided by an embodiment of the present application further includes a coating 4, and the coating 4 is provided at the other end of the magnetic steel 1. The coating 4 may be made of Zn-plated, Ni-plated, and polymer materials. That is, the coating 4 is provided on an outer surface of the above magnetic steels 1 which are overall presented as a cylindrical shape after splicing.

As an embodiment, the magnetic energy product of the magnetic steel 1 is greater than 26 MGOe, i.e., it is assumed that the magnetic energy product of the magnetic steel 1 is (BH)max, then (BH)max≥26 MGOe. The intrinsic coercive force of the magnetic steel 1 is greater than 11 KOe, i.e., it is assumed that the intrinsic coercive force of the magnetic steel 1 is Hcj, then Hcj≥11 KOe.

As an embodiment, an electric motor provided by an embodiment of the present application further includes a first claw pole 5, a second claw pole 6, and a first plastic member 7. The first plastic member 7 is provided outside the rotating shaft 2, and the magnetic steels 1 are located between the rotating shaft 2 and the first plastic member 7. The first plastic member 7 includes first limit grooves 71 and second limit groove 72. The plurality of the first limit grooves 71 are spaced apart from each other, and each second limit groove 72 is provided between two adjacent first limit grooves 71. The first claw pole 5 includes a first claw disc 51 and a plurality of first claw fingers 52. The plurality of first claw fingers 52 are connected to the first claw disc 51, and each first claw finger 52 is embedded in a corresponding first limit groove 71. Each first limit groove 71 is provided with a space for accommodating the first claw fingers 52. The second claw pole 6 includes a second claw disc 61 and a plurality of second claw fingers 62. The plurality of second claw fingers 62 is connected to the second claw disc 61, and each second claw finger 62 is embedded in a corresponding second limit groove 72. Each second limit groove 72 is provided with a space for accommodating the second claw fingers 62, and each second claw finger 62 is provided between two adjacent first claw fingers 52, i.e., the first claw fingers 52 and the second claw fingers 62 are distributed in an alternating manner along the exterior of the rotating shaft for alternate distribution.

Figure 6:
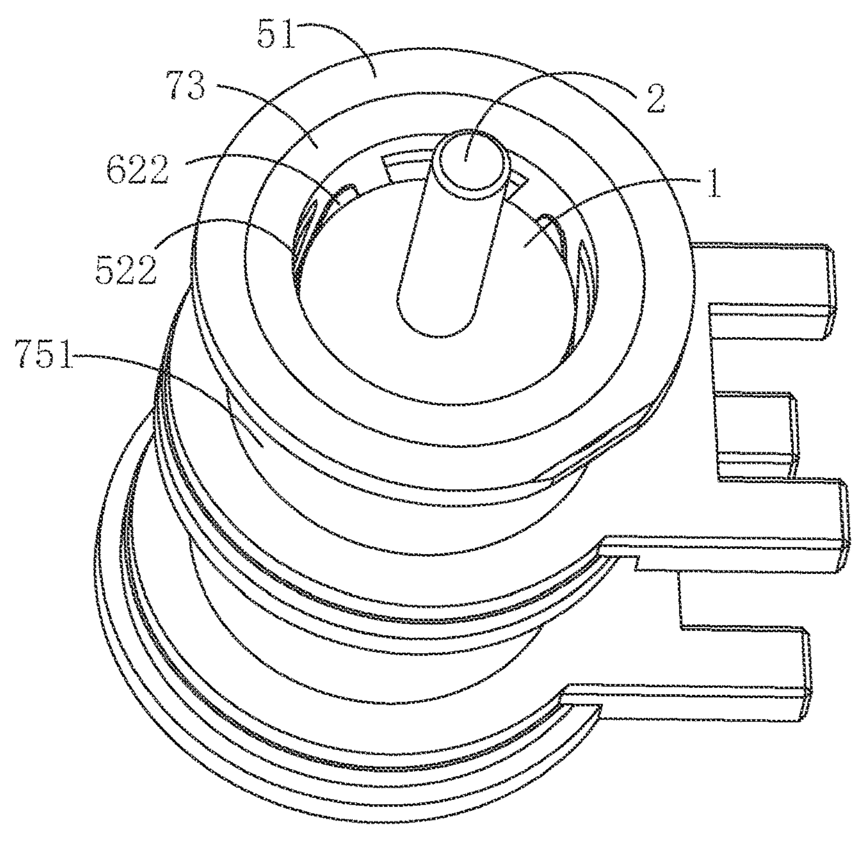
FIG. 6 shows a structural schematic view of a rotating shaft in the electric motor provided by an embodiment of the present application.
Figure 7:
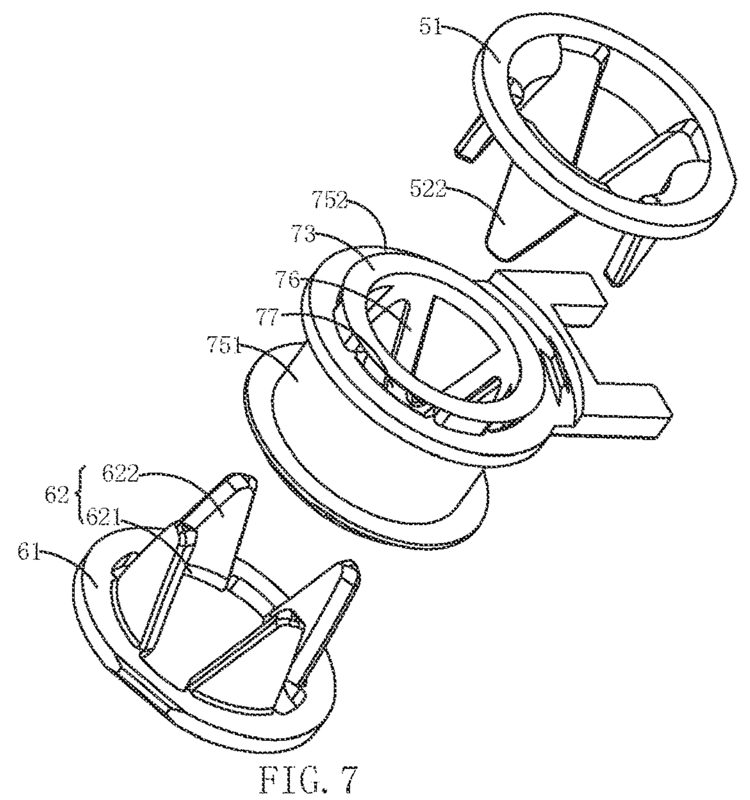
FIG. 7 shows a structural schematic view of a first claw pole, a second claw pole, and a first plastic member in the electric motor provided by an embodiment of the present application.
Figure 8:
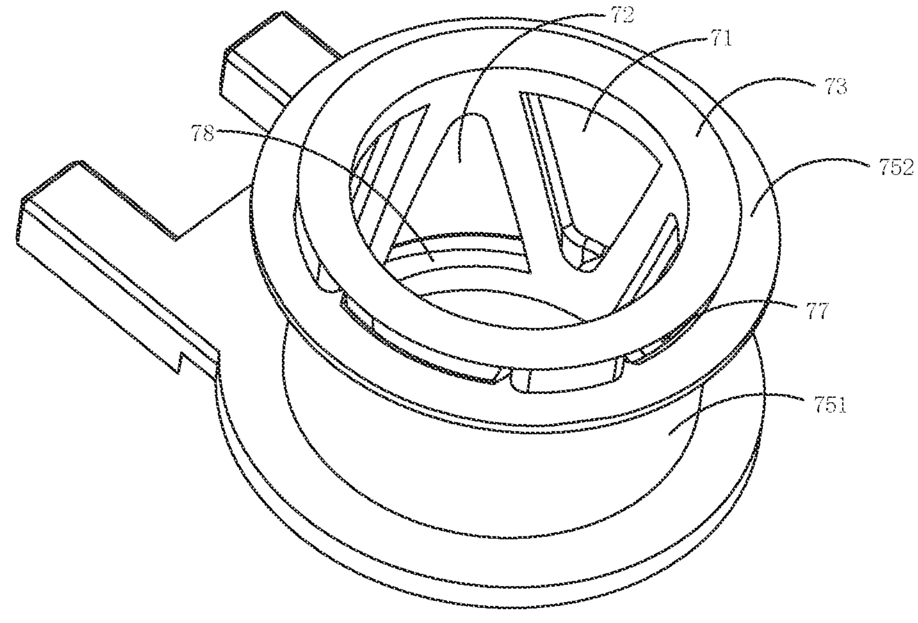
FIG. 8 shows a structural schematic view of a first limit groove, a second limit groove, and a first through-slot in the electric motor provided by an embodiment of the present application.
Figure 9:
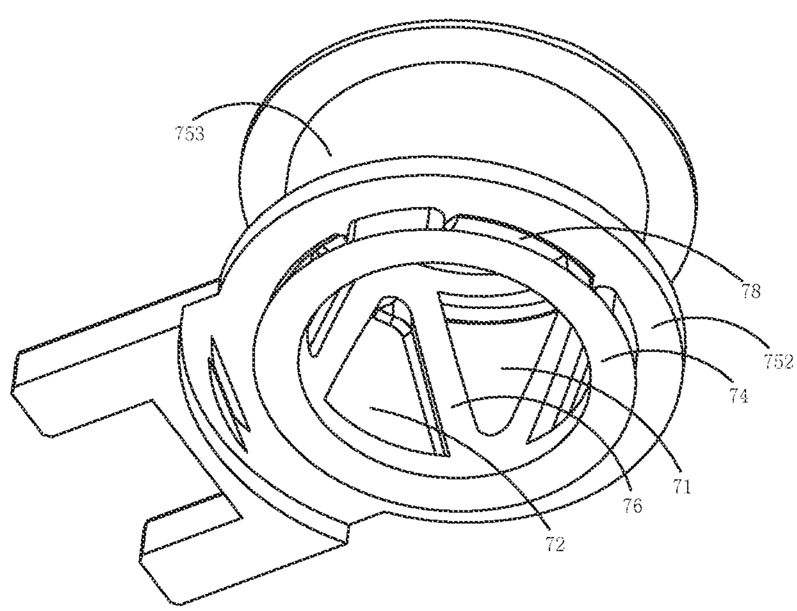
FIG. 9 shows a structural schematic view of a second through-slot in the electric motor provided by an embodiment of the present application.
Figure 10:
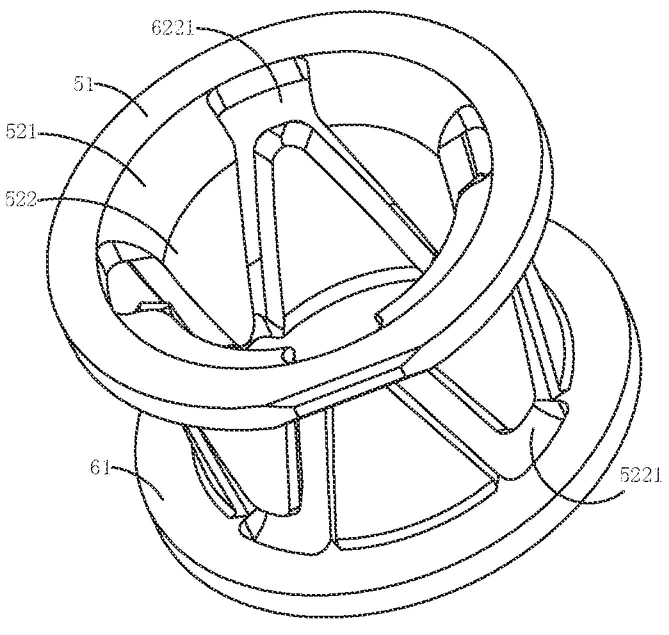
FIG. 10 is a structural schematic view of a first claw disc and a second claw disc in the electric motor provided by an embodiment of the present application.
Figure 11:
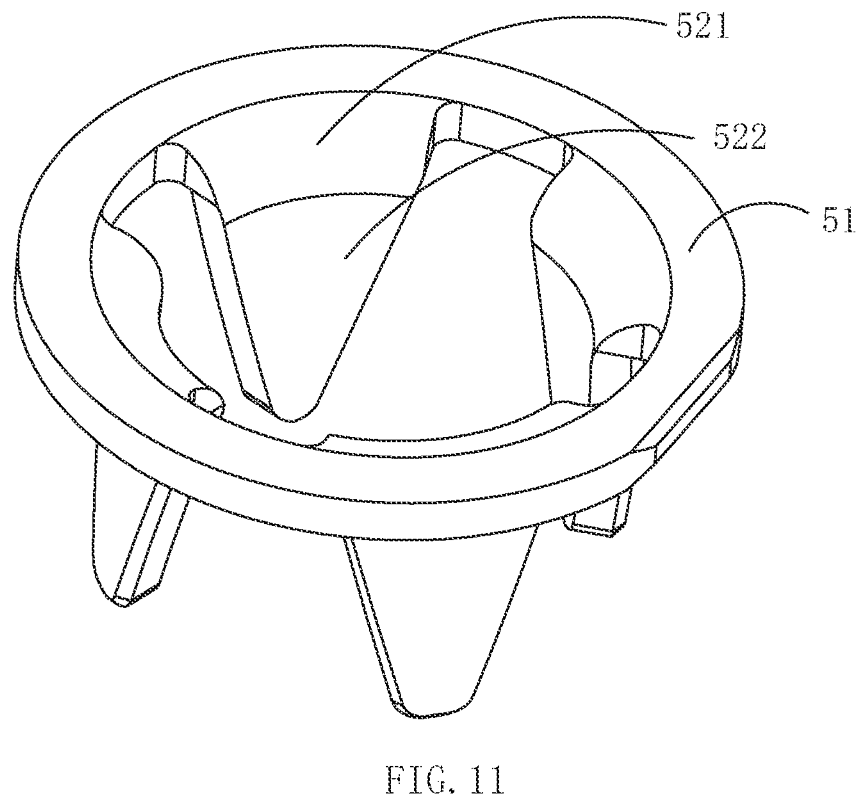
FIG. 11 is a structural schematic view of a first finger root portion and a first fingertip portion in the electric motor provided by an embodiment of the present application.

As an embodiment, as shown in FIGS. 6 to 8, the first plastic member 7 includes a first limit portion 73, a second limit portion 74, and a housing 75. The first limit portion 73 and the second limit portion 74 are arranged opposite to each other, and the housing 75 is connected to the first limit portion 73 and the second limit portion 74. A plurality of support members 76 are provided between the first limit portion 73 and the second limit portion 74. The first limit portion 73 and the two adjacent support members 76 enclose the above-described first limit groove 71, and the second limit portion 74 and the two adjacent support members 76 enclose the above-described second limit groove 72.

As an embodiment, the first limit portion 73, the support members 76, and the housing 75 enclose to form a first through-slot 77. The first claw fingers 52 pass through the first through-slot 77, and the first through-slot 77 and the first limit groove 71 are in communication, such that the first claw fingers 52 extend into the first limit groove 71 after passing through the first through-slot 77. The second limit portion 74, the support members 76, and the housing 75 enclose to form a second through-slot 78. The second claw fingers 62 pass through the second through-slot 78, and the second through-slot 78 and the second limit groove 72 are in communication, such that the second claw fingers 62 extend into the second limit groove 72 after passing through the second through-slot 78.

As an embodiment, the housing 75 includes a body 751 and two extension portions 752. The two extension portions 752 are each connected to the body 751, and the body 751 is connected to the first limit portion 73 and the second limit portion 74. The body 751 and the two extension portions 752 are enclosed to form a mounting groove 753, and the interior of the mounting groove 753 is provided with a space for placing the coil 9.

As an embodiment, a projection of the first limit portion 73 along a lengthwise extension direction of the rotating shaft 2 is located on one of the extension portions 752, and the first claw disc 51 is connected to one of the extension portions 752. A projection of the second limit portion 74 along a lengthwise extension direction of the rotating shaft 2 is located on the other extension portion 752, and the second claw disc 61 is connected to the other extension portion 752.

As an embodiment, the coil 9 may be wound integrally with the first claw pole 5 and the second claw pole 6 after the first claw pole 5 and the second claw pole 6 are integrally injection molded. The first claw fingers 52 are tapered in a direction toward the second claw disc 61, and the second claw finger 62 are tapered in a direction toward the first claw disc 51.

In some embodiments, as shown in FIGS. 3 to 13, each first claw finger 52 includes a first finger root portion 521 and a first fingertip portion 522. The first fingertip portion 522 is connected to the first finger root portion 521, the first finger root portion 521 is connected to the first claw disc 51, and the first fingertip portion 522 is presented as a concave shape along a direction toward the rotating shaft 2. Each second claw finger 62 includes a second finger root portion 621 and a second fingertip portion 622. The second fingertip portion 622 is connected to the second finger root portion 621, the second finger root portion 621 is connected to the second claw disc 61, and the second fingertip portion 622 is presented as a concave shape along a direction toward the rotating shaft 2. The second fingertip portion 622 and the first fingertip portion 522 are surrounded as a circular shape, which is able to increase the inner space of the circular shape, providing a larger space for accommodating the rotating shaft 2 and the plurality of magnetic steels 1 arranged in a circumferential direction around the rotating shaft 2.

As an embodiment, the spacing of the first finger root portion 521 from the rotating shaft 2 along the direction toward the first claw disc 51 is gradually enlarged, so that the first finger root portion 521 is presented as a curved shape. The spacing of the second finger root portion 621 from the rotating shaft 2 along the direction toward the second claw disc 61 is gradually enlarged, such that the second finger root portion 621 is presented as a curved shape.

As an embodiment, a first gap 5221 is left between the first fingertip portion 522 and the second claw disc 61, and a second gap 6221 is left between the second fingertip portion 622 and the first claw disc 51. The spacing of the first gap 5221 and the spacing of the second gap 6221 are equal, such that the joints of the two adjacent support members 76 disposed within the spacing have a large width.

In some embodiments, the extension lines of the two support members 76 disposed on both sides of each first claw finger 52 cross each other, which is conducive to improving the strength of the overall structure of the first claw pole 5, the second claw pole 6, the first plastic member 7, and the support members 76 by providing the support members 76 that cross each other.

Figure 3:
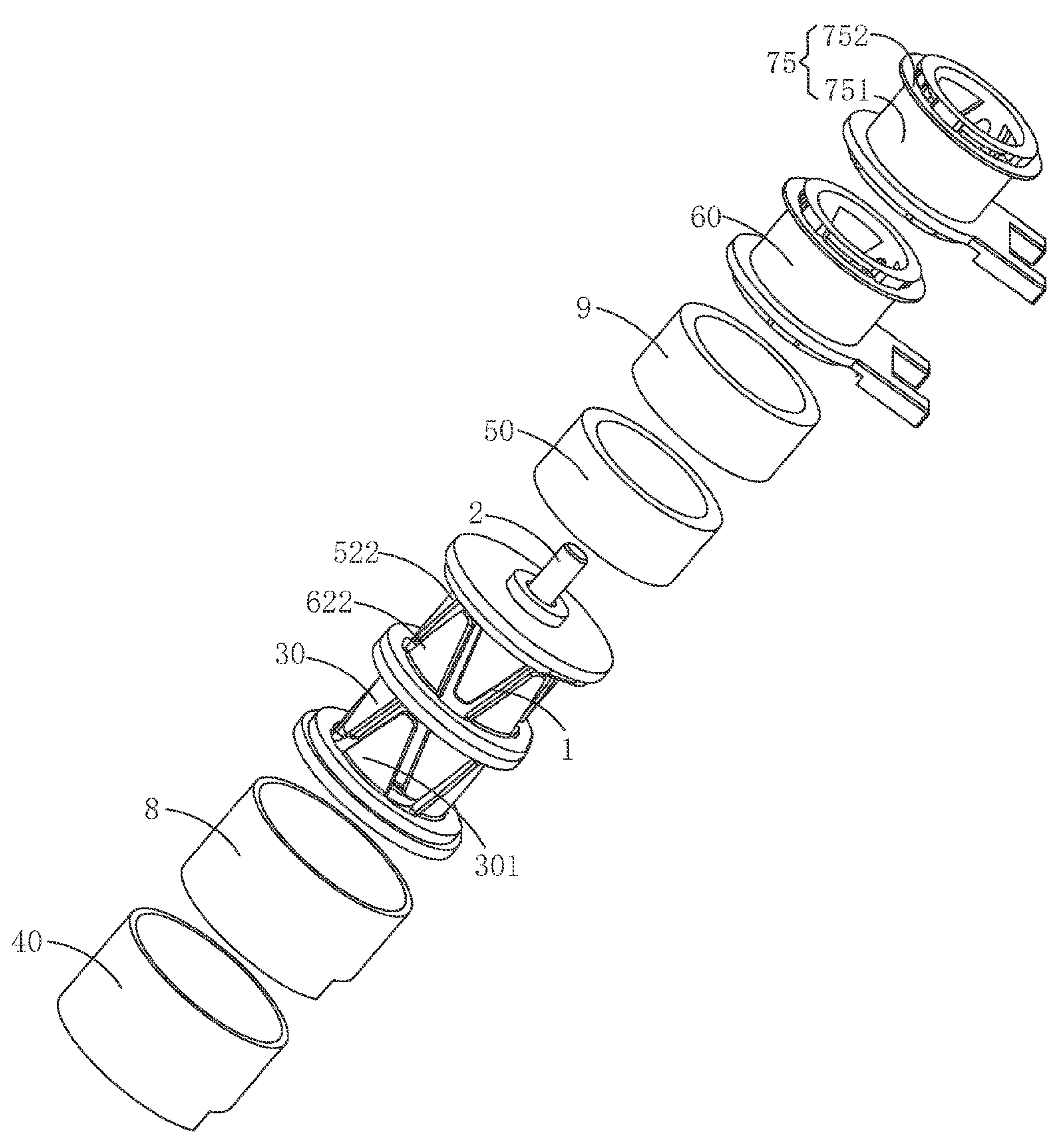
FIG. 3 shows an exploded view of the electric motor provided by an embodiment of the present application.
Figure 4:
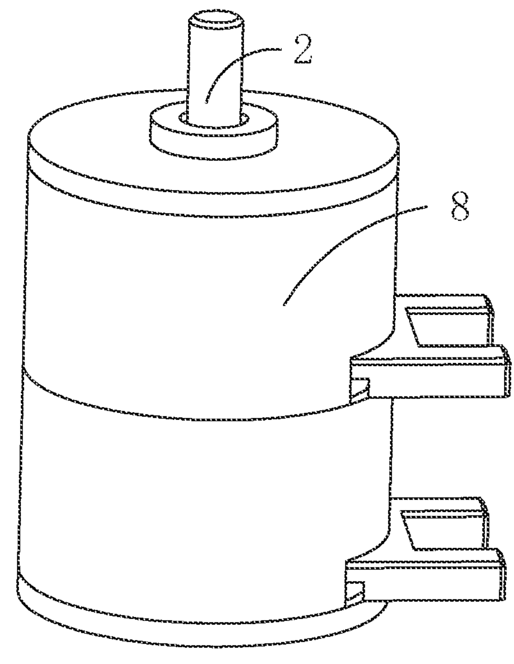
FIG. 4 shows a structural schematic view of the electric motor provided by an embodiment of the present application.
Figure 5:
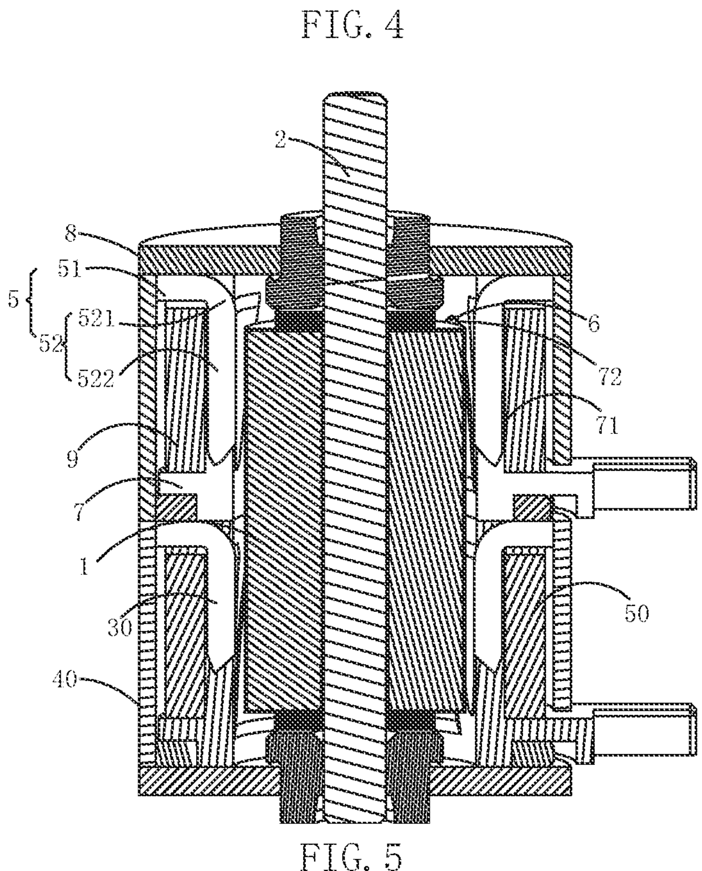
FIG. 5 shows a sectional view of the electric motor provided by an embodiment of the present application.

In some embodiments, as shown in FIG. 3, an electric motor provided by an embodiment of the present application further includes a fifth claw pole 30, a sixth claw pole 301, another housing 40, another coil 50, and another plastic member 60. Since the fifth claw pole 30 has the same structure and principle as the above-described first claw pole 5, it is not repeated herein. Since the sixth claw pole 301 has the same structure and principle as the above-described second claw pole 6, it is not repeated herein. Since the another housing 40 has the same structure and principle as the next-mentioned housing 8, it is not repeated herein. Since the another coil 50 has the same structure and principle as the above-described coil 9, it is not repeated herein. Since the another plastic member 60 has the same structure and principle as the first plastic member 7 described above, it is not repeated herein. By mounting the fifth claw pole 30 and the sixth claw pole 301 to the another plastic member 60, mounting the another coil 50 to the exterior of the another plastic member 60, sleeving the another housing 40 on the exterior of the other coil 50, and mounting the above-described first plastic member 7 and the another plastic member 60 along the vertical direction, the electric motor is capable of accommodating the longer rotating shaft 2 and mounting the longer plurality of magnetic steels 1.

As another embodiment, as shown in FIGS. 12 to 14, an electric motor provided by an embodiment of the present application further includes a third claw pole 10, a fourth claw pole 20, and a second plastic member 203. The third claw pole 10 includes a third claw disc 101 and a plurality of third claw fingers 102. The plurality of third claw fingers 102 is connected to the third claw disc 101, and the plurality of third claw fingers 102 extend into the interior of the second plastic member 203. The plurality of third claw fingers 102 may be presented as equally spaced distribution, and the plurality of third claw fingers 102 are arranged between the second plastic member 203 and the magnetic steel 1. The fourth claw pole 20 includes a cover body 201 and a plurality of fourth claw fingers 202. The plurality of fourth claw fingers 202 are connected to the cover body 201, and the cover body 201 is arranged outside the second plastic member 203. A mounting port 2011 may be provided on the cover body 201. The plurality of fourth claw fingers 202 extend into the inside of the second plastic member 203, and each fourth claw finger 202 is located between two adjacent third claw fingers 102. The plurality of fourth claw fingers 202 may be presented as equally spaced distribution, and the plurality of fourth claw fingers 202 are arranged between the second plastic member 203 and the magnetic steel 1. Moreover, the cover body 201 may be in communication with the third claw disc 101, such that the third claw disc 101, the cover body 201, and the second plastic member 203 enclose to form a space for placing the coil 9.

In some embodiments, an electric motor provided by an embodiment of the present application further includes a housing 8, and it can be understood by a person skilled in the art that there is no restriction on the specific structure of the housing 8 in the electric motor provided by an embodiment of the present application. The only requirement is to place the first plastic component 7 equipped with the coil 9, the first claw pole 5 and the second claw pole 6 inside the housing 8, and place the rotating shaft 2 and the plurality of magnetic steels 1 arranged circumferentially around the shaft 2 inside the first plastic component 7. The rotation of the rotating shaft 2 and the movement of the plurality of magnetic steels 1 around the rotating shaft 2 within the housing 8 are driven by the energized coils 9.

Described above are only some embodiments of the present application, and it should be pointed out herein that, for the person of ordinary skill in the field, improvements may be made without departing from the inventive concept of the present application, but these are all within the protection scope of the present application.

What is claimed is:

1. An electric motor, comprising:

a plurality of magnetic steels arranged in a circumferential direction around a rotating shaft; wherein two adjacent magnetic steels have opposite magnetic polarities at one end proximate to the rotating shaft, and two adjacent magnetic steels have opposite magnetic polarities at the other end; the magnetic steels are sintered magnetic steels;

a first claw pole;

a second claw pole; and a first plastic member arranged outside the rotating shaft comprising a plurality of spaced-apart first limit grooves and a second limit groove arranged between two adjacent first limit grooves;

wherein the first claw pole comprises a first claw disc and a plurality of first claw fingers connected to the first claw disc, wherein the first claw fingers are embedded in the first limit grooves correspondingly; the second claw pole comprises a second claw disc and a plurality of second claw fingers connected to the second claw disc, wherein the second claw fingers are embedded in the second limit grooves correspondingly, and each of the second claw fingers is provided between two adjacent first claw fingers.

2. The electric motor of claim 1, wherein the first plastic member comprises a first limit portion and a second limit portion arranged opposite to each other, and a housing connecting the first limit portion and the second limit portion; a plurality of support members are arranged between the first limit portion and the second limit portion, the first limit groove is enclosed by two adjacent support members and the first limit portion, and the second limit groove is enclosed by two adjacent support members and the second limit portion.

3. The electric motor of claim 2, wherein the first limit portion, the support members and the housing enclose to form a first through-slot for the first claw fingers to pass through; the first through-slot is in communication with the first limit groove; the second limit portion, the support members and the housing enclose to form a second through-slot for the second claw fingers to pass through, and the second through-slot is in communication with the second limit groove.

4. The electric motor of claim 2, wherein the housing comprises a body and two extension portions connected to the body; the body is connected to the first limit portion and the second limit portion, and the body and the two extension portions enclose to form a mounting groove for placing a coil.

5. The electric motor of claim 1, wherein the first claw fingers are tapered in a direction toward the second claw disc, the second claw fingers are tapered in a direction toward the first claw disc, and the first claw pole and the second claw pole are each integrally injection molded.

6. The electric motor of claim 1, further comprising a third claw pole, a fourth claw pole, and a second plastic member arranged outside the rotating shaft, wherein the third claw pole comprises a third claw disc and a plurality of third claw fingers connected to the third claw disc, and the plurality of third claw fingers extend into the second plastic member; the fourth claw pole comprises a cover body and a plurality of fourth claw fingers connected to the cover body; the cover body is arranged outside the second plastic member; the plurality of fourth claw fingers extend into the second plastic member, and the fourth claw fingers are arranged between two adjacent third claw fingers.

7. The electric motor of claim 1, further comprising an adhesive layer provided between two adjacent magnetic steels.

8. The electric motor of claim 1, further comprising a coating provided at the other end of the magnetic steels.

9. The electric motor of claim 1, wherein a magnetic energy product of the magnetic steels is greater than 26 MGOe and an intrinsic coercive force of the magnetic steels is greater than 11 KOe.

* * * * *